Oct. 25, 1938.　　　　P. C. BUTLER　　　　2,134,657
MOTOR VEHICLE CHASSIS WASHER
Filed Aug. 27, 1937　　　3 Sheets-Sheet 1
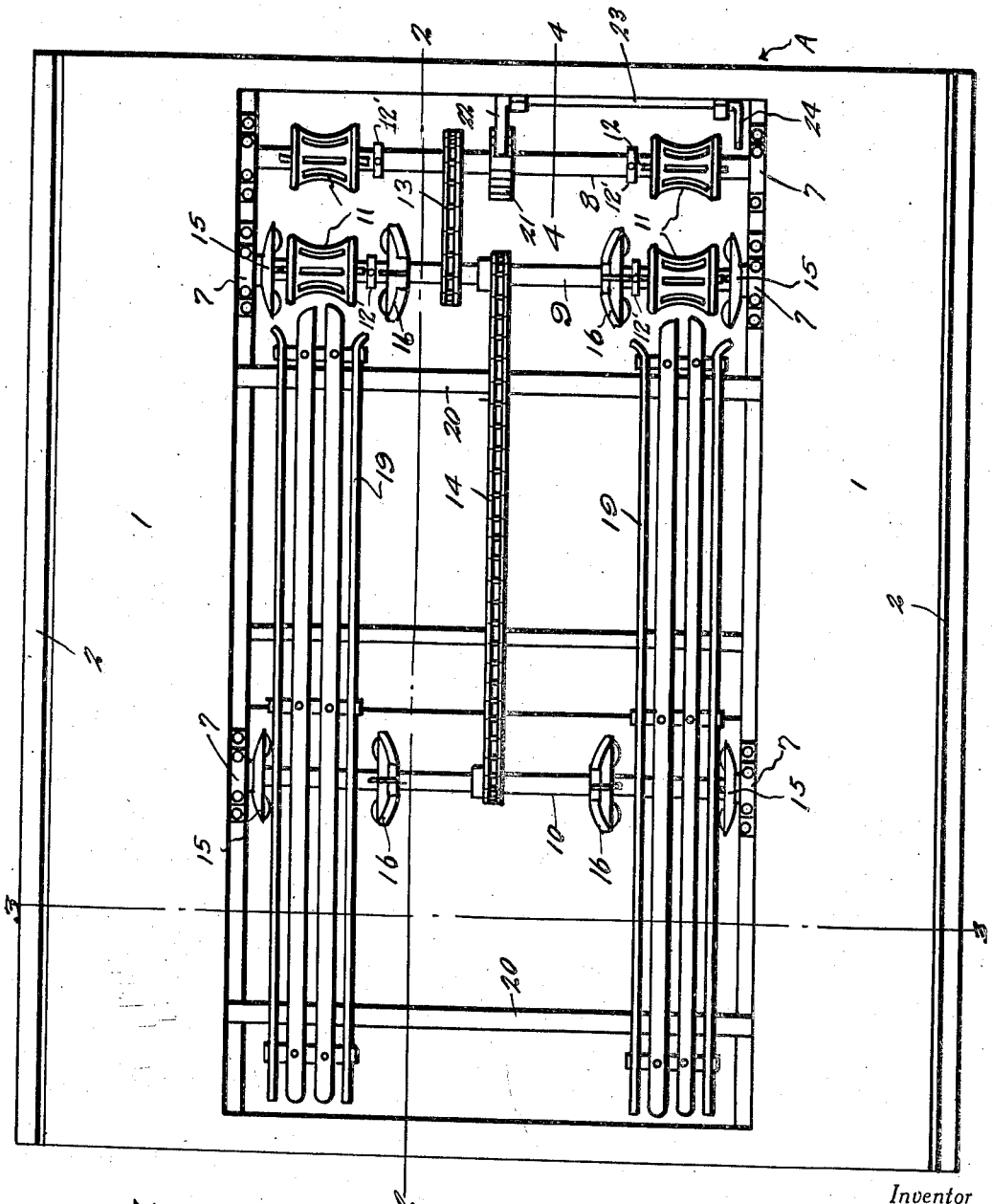
Inventor
*Park C. Butler*
By *Clarence A. O'Brien*
*Hyman Berman*
Attorneys Oct. 25, 1938. P. C. BUTLER 2,134,657
MOTOR VEHICLE CHASSIS WASHER
Filed Aug. 27, 1937 3 Sheets-Sheet 2
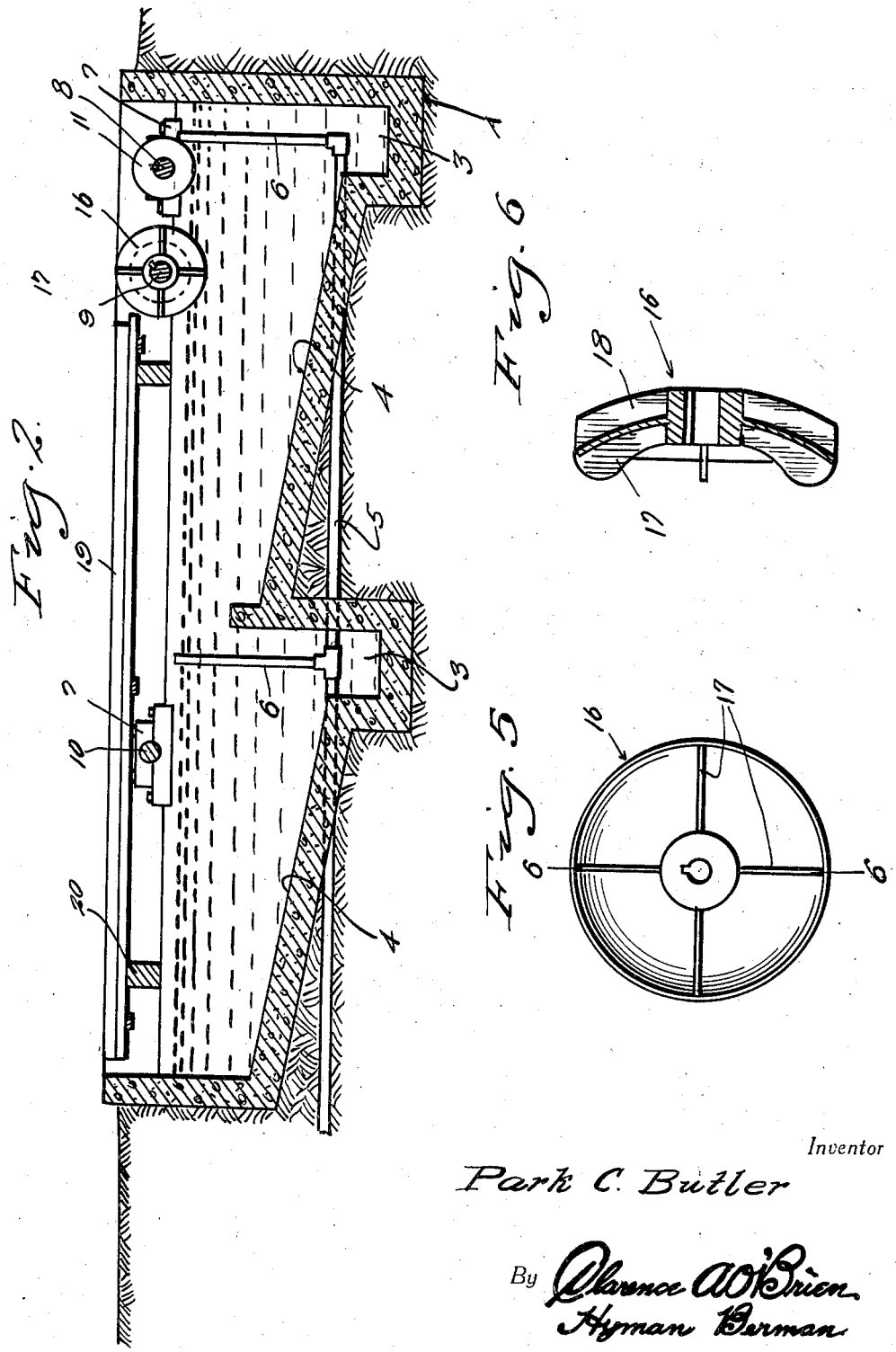
Inventor
Park C. Butler
By Clarence A. O'Brien
Hyman Berman
Attorneys Oct. 25, 1938.　　　　P. C. BUTLER　　　　2,134,657
MOTOR VEHICLE CHASSIS WASHER
Filed Aug. 27, 1937　　　3 Sheets-Sheet 3
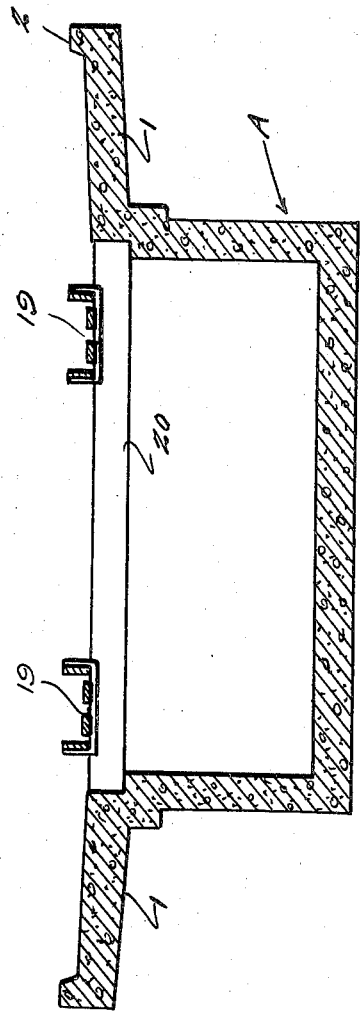
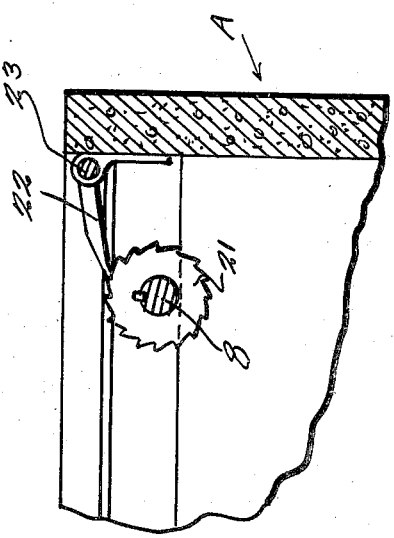
Inventor
Park C. Butler
By Clarence A. O'Brien
Hyman Berman
Attorneys Patented Oct. 25, 1938

2,134,657

UNITED STATES PATENT OFFICE 2,134,657

MOTOR VEHICLE CHASSIS WASHER

Park C. Butler, Nevada, Mo.

Application August 27, 1937, Serial No. 161,334

5 Claims. (Cl. 141—1)

This invention relates to a device for washing the chassis and under parts of the fenders of a motor vehicle, the general object of the invention being to provide a pit containing water and across which shafts extend, some of the shafts carrying paddle members for throwing the water against the chassis and under parts of a motor vehicle when the shafts are rotated, and means for rotating the shafts by the rear wheels of the vehicle when the same are driven from the power plant of the vehicle.

This invention is an improvement over that forming the subject matter of a patent granted to me on September 10, 1935, No. 2,013,742.

Some of the objects of the present invention over that shown in the patent are to cheapen the cost of production and to simplify the device.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which—

Figure 1 is a top plan view of the invention.

Figure 2 is a section on the line 2—2 of Figure 1.

Figure 3 is a section on the line 3—3 of Figure 1.

Figure 4 is a section on the line 4—4 of Figure 1.

Figure 5 is a view of one of the paddle members.

Figure 6 is a section on the line 6—6 of Figure 5.

In these drawings the letter A indicates a pit preferably formed of reinforced concrete, as shown, the sides of the pit being provided with substantially horizontal extensions 1, each having a rim 2 extending upwardly at its outer edge and the top surface of each extension sloping downwardly and inwardly toward the pit so that water falling on said extensions will flow back into the pit. A pair of mud sumps 3 are formed in the bottom of the pit and extend transversely across the same, one being arranged at the front end of the pit and the other at approximately the center of the pit and the bottom of the pit is formed with parts sloping downwardly and forwardly toward these sumps as shown at 4 so that the mud settling to the bottom of the pit will gravitate into the sumps.

A drain pipe 5 is provided with the vertical branches 6 which extend to a point where the water level in the pit is to be maintained so that surplus water will drain through these branches into the pipe which leads to a sewer or the like.

A plurality of pairs of bearings 7 are arranged at the sides of the pit and these bearings rotatably support a front shaft 8, an adjacent shaft 9 and a shaft 10 which is arranged rearwardly of the transverse center of the pit. The shafts 8 and 9 each carries a pair of concave rollers 11 having treads thereon and these four rollers are arranged to be engaged by the rear wheels of a vehicle and when the wheels of the vehicle are being rotated by the power plant of the vehicle their tires engaging the rollers 11 will cause the same to rotate and thus the shafts 8 and 9 will be rotated. Each roller 11 is supported for limited sliding movement on its shaft by the key 12 so that these rollers can adjust themselves to different widths of motor vehicles, collars 12' being fastened to the shaft for limiting this sliding movement.

The shafts 8 and 9 are connected together by the chain and sprockets shown generally at 13 and the shafts 9 and 10 are connected together by the chain and sprockets shown generally at 14. Thus the shaft 10 will be driven from the shaft 9. Said shafts 9 and 10 each carries four paddle wheels, two of which are arranged adjacent the ends of the shaft as shown at 15 and the other two 16 are arranged inwardly of the rollers 11 of the shaft 9. The wheels 16 of the shaft 10 are in longitudinal alignment with the similar wheels of the shaft 9. Each of the wheels 15 and 16 are of substantially concavo-convex shape with the wheels 15 having their concave faces facing inwardly while the wheels 16 have their concave faces facing outwardly. Each wheel is keyed to its shaft as shown in Figures 5 and 6 and each of the wheels 15 and 16 has radiating paddles 17 on its concave face and each of the wheels 16 has radiating paddles 18 on its convex face. The wheels 15 do not have the paddles 18 on their convex faces.

A pair of longitudinally extending trough-shaped members 19, each of slatted construction as shown, is supported by the cross beams 20 supported from the sides of the pit and each trough member extends from a point slightly rearwardly of the rollers 11 of the shaft 9, rearwardly between the pair of paddle wheels on the shaft 10 to a point adjacent the rear end of the pit. The front ends of the members 19 are made so that the front wheels of a vehicle passing over the rollers 11 can readily run onto the trough-shaped members.

A ratchet wheel 21 is connected with the shaft 8 and is adapted to be engaged by a dog 22 carried by a shaft 23 journaled in the front end of the pit and provided with a handle 24 by which it may be rocked to place the dog into engagement with the ratchet wheel or out of engagement therewith.

When a car is to be washed it is driven to the pit and as it enters the device its front wheels will run over the rollers 11 on to the trough-shaped members 19 and when the rear wheels engage the two pairs of rollers 11 further movement of the vehicle will cease and the rotating rear wheels will drive the rollers 11 and thus the shafts 9 and 8 will be rotated as well as the shaft 10. The paddle members will throw the water against the chassis and under parts of the car including the fenders so that the same will be washed. Then after the washing operation has been finished the dog 22 is placed in engagement with the ratchet wheel 21 to stop rotary movement of the shaft 8 and this shaft through means of the chain and sprockets 13 and 14 will stop rotary movement of the shafts 9 and 10 and thus the rollers 11 will come to rest and then the rear wheels can ride off the rollers 11 onto the trough members 19 and thus the car can be driven from the device.

Any suitable runway can be built to enable the car to reach the pit and to be driven over the same onto the rollers and trough-shaped members and then to be driven from the pit after being washed.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a motor vehicle washing device, a pit adapted to contain water, a pair of transversely extending shafts rotatably supported in the pit, rollers on the shafts for receiving the rear wheels of the vehicle, runways for the front wheels of the vehicle extended from a point adjacent the rear roller carrying shaft to the rear of the pit and receiving the front wheels after the same have passed over the rollers, means for connecting the shafts together whereby movement of one shaft will be communicated to the other shaft, ratchet means for preventing movement of one shaft by forward movement of the vehicle wheels over the rollers, a third shaft extending across an intermediate part of the pit and supported for rotary movement, paddles carried by the third shaft and means for rotating the third shaft by one of the other shafts.

2. In a motor vehicle washing device, a pit adapted to contain water, a pair of shafts extending across the pit adjacent the front end thereof and rotatably supported, rollers carried by said shafts and adapted to be engaged by the rear wheels of the vehicle, a third shaft extending across an intermediate part of the pit and supported for rotary movement, means for rotating said shaft from one of the other shafts, paddle wheels carried by the third shaft and said one other shaft, and runways for the front wheels of the vehicle supported above the water in the pit and extending from a point adjacent the rear roller carrying shaft to the rear of the pit.

3. In a motor vehicle washing device, a pit adapted to contain water, a pair of shafts extending across the pit adjacent the front end thereof and rotatably supported, rollers carried by said shafts and adapted to be engaged by the rear wheels of the vehicle, a third shaft extending across an intermediate part of the pit and supported for rotary movement, means for rotating said shaft from one of the other shafts, paddle wheels carried by the third shaft and said one other shaft, and runways for the front wheels of the vehicle supported above the water in the pit and extending from a point adjacent the rear roller carrying shaft to the rear of the pit, said runways being of slatted construction.

4. In a motor vehicle washing device, a pit adapted to contain water, a pair of transversely extending shafts adjacent the front of the pit and supported for rotary movement, rollers carried by the shafts and adapted to be engaged by the rear wheels of a vehicle, means for connecting the two shafts together whereby rotary movement of one shaft will be imparted to the other shaft, manually operated means for locking the first shaft against movement in one direction, a third shaft extending across the pit and supported for rotary movement, means for rotating the third shaft from the second shaft, runways for the wheels of the vehicle extending from a point in rear of the rollers of the second shaft to a point adjacent the rear end of the pit, said runways being of slatted construction and paddle wheels carried by the third shaft and the rearmost shaft of the pair of shafts.

5. In a motor vehicle washing device, a pit adapted to contain water, a number of transversely extending shafts rotatably supported in the pit, rollers on some of the shafts for receiving the rear wheels of the vehicle, means for connecting the shafts together whereby movement of one shaft will be communicated to the other shafts and paddle wheels carried by some of the shafts for throwing water from the pit against the under portions of the vehicle, each roller having a concave tread and means for slidably but non-rotatably connecting each roller to its shaft, whereby the rollers will adjust themselves to vehicles of different widths.

PARK C. BUTLER.